US012664417B2

(12) United States Patent
Chan

(10) Patent No.: US 12,664,417 B2
(45) Date of Patent: Jun. 23, 2026

(54) MAGNETIC EFFECT ARTIFICIAL INTELLIGENCE SYSTEM

(71) Applicant: Chia-Chen Chan, Taipei (TW)

(72) Inventor: Chia-Chen Chan, Taipei (TW)

( * ) Notice: Subject to any disclaimer, the term of this patent is extended or adjusted under 35 U.S.C. 154(b) by 683 days.

(21) Appl. No.: 18/124,513

(22) Filed: Mar. 21, 2023

(65) Prior Publication Data

US 2023/0244922 A1     Aug. 3, 2023

Related U.S. Application Data

(63) Continuation-in-part of application No. 16/531,085, filed on Aug. 4, 2019, now abandoned.

(51) Int. Cl.
| | |
|---|---|
| *G06N 3/065* | (2023.01) |
| *G06N 3/04* | (2023.01) |
| *H01F 1/01* | (2006.01) |

(52) U.S. Cl.
CPC .............. *G06N 3/065* (2023.01); *G06N 3/04* (2013.01); *H01F 1/01* (2013.01)

(58) Field of Classification Search
CPC .......... G06N 3/063; G06N 3/065; G06N 3/04; H01F 1/01
See application file for complete search history.

(56) References Cited

U.S. PATENT DOCUMENTS

| | | | | |
|---|---|---|---|---|
| 8,329,319 B2 * | 12/2012 | Shi | .................... | H10N 70/8828 |
| | | | | 428/812 |
| 2009/0148649 A1 * | 6/2009 | Shi | ...................... | H10N 70/884 |
| | | | | 252/62.51 R |

| | | | | |
|---|---|---|---|---|
| 2019/0207076 A1 * | 7/2019 | Schneider | .............. | G06N 3/049 |
| 2019/0245136 A1 * | 8/2019 | Choi | ....................... | H10N 50/01 |
| 2020/0293879 A1 * | 9/2020 | Rubin | .................... | G06N 3/084 |
| 2021/0201123 A1 * | 7/2021 | Grollier | ................. | G06N 3/049 |
| 2021/0232903 A1 * | 7/2021 | Friedman | ............... | G06N 3/065 |
| 2021/0313987 A1 * | 10/2021 | Faldu | ....................... | A61N 1/05 |

FOREIGN PATENT DOCUMENTS

WO     WO-2024074799 A1 *   4/2024   ............. G06N 3/065

OTHER PUBLICATIONS

Pizzi, Rita, et al. "Evidences of new biophysical properties of microtubules." Artificial Neural Networks. Nova Science Publishers, Inc (2010): 1-17 (Year: 2010).*
Fan, Deliang, et al. "STT-SNN: A spin-transfer-torque based soft-limiting non-linear neuron for low-power artificial neural networks." IEEE Transactions on Nanotechnology 14.6 (2015): 1013-1023. (Year: 2015).*

(Continued)

*Primary Examiner* — Randall K. Baldwin
(74) *Attorney, Agent, or Firm* — KIRTON McCONKIE; Evan R. Witt

(57)     ABSTRACT

A magnetic effect artificial intelligence system includes an input pre-processing unit, a plurality of magnetic effect artificial neurons connected with the input pre-processing unit, and an output unit connected with the plurality of magnetic effect artificial neurons. Each of the plurality of magnetic effect artificial neurons is shaped as a three-layered hexagonal prism made of Mu-metal and ferrite materials, and substantially attaches to adjacent ones of the plurality of magnetic effect artificial neurons.

14 Claims, 6 Drawing Sheets

(56) References Cited

OTHER PUBLICATIONS

Li, Sai, et al. "Magnetic skyrmion-based artificial neuron device." Nanotechnology 28.31 (2017): 31LT01: 1-7. (Year: 2017).*

Ross, Andrew, et al. "Multilayer spintronic neural networks with radio-frequency connections." arXiv preprint arXiv:2211.03659 (2022). (Year: 2022).*

Zheng, Qi, et al. "Recurrent Neural Networks Made of Magnetic Tunnel Junctions." arXiv preprint arXiv:1912.08596 v2 (2020). (Year: 2020).*

Grollier, Julie, Damien Querlioz, and Mark D. Stiles. "Spintronic nanodevices for bioinspired computing." Proceedings of the IEEE 104.10 (2016): 2024-2039. (Year: 2016).*

Brigner, Wesley H., et al. "Shape-based magnetic domain wall drift for an artificial spintronic leaky integrate-and-fire neuron." IEEE Transactions on Electron Devices 66.11 (2019): 4970-4975. (Year: 2019).*

Sengupta, Abhronil, and Kaushik Roy. "Spin-transfer torque magnetic neuron for low power neuromorphic computing." 2015 International Joint Conference on Neural Networks (IJCNN). IEEE, 2015. (Year: 2015).*

Grollier, J., et al. "Spintronics for neuromorphic computing." arXiv preprint arXiv:2007.06092 (2020). (Year: 2020).*

* cited by examiner

MAGNETIC EFFECT ARTIFICIAL INTELLIGENCE SYSTEM

CROSS-REFERENCE TO RELATED APPLICATION

This application is a continuation-in-part application of U.S. application Ser. No. 16/531,085 filed on Aug. 4, 2019, and entitled "MAGNETIC EFFECT ARTIFICIAL INTEL-LIGENCE SYSTEM" and published as US 2021/0034954 A1 on Feb. 4, 2021. The entire contents of the above-mentioned patent applications are incorporated herein by reference for all purposes.

FIELD OF THE INVENTION

The present invention relates to an artificial intelligence system, and more particularly to a magnetic effect artificial intelligence system.

BACKGROUND OF THE INVENTION

Cells within the human nervous system, called neurons, communicate with each other. The neuron is the basic working unit of the brain, designed to transmit information to other nerve cells, muscle, or gland cells.

In recent years, artificial intelligence (AI) has flourished in our lives. One of the most commonly used artificial intelligence models is artificial neural network, which uses a large number of calculations by computers to simulate the operation of human neurons. In the artificial neural network, each artificial neuron is connected to other neurons through a synapse, which can transmit a signal to other neurons. The neuron receives signals then processes them and can signal neurons connected to it. The neurons typically have a weight that adjusts as learning proceeds. The weight increases or decreases the strength of the signal at a connection. Neurons may have a threshold such that a signal is sent only if the aggregate signal crosses that threshold.

Such model requires a lot of data to train, and also a lot of calculations with various mathematic computing. For example, the self-driving car or the computer Go may needs thousands, tens of thousands, or even hundreds of thousands of computers to form a huge system for training and calcu-lation, which is a very complicated and costly process.

Therefore, there is a need of developing a novel artificial intelligence system to overcome the drawbacks of the con-ventional technologies.

SUMMARY OF THE INVENTION

An object of the present invention is to provide a magnetic effect artificial intelligence system, which employs the prop-erty of magnetism to simulate human neurons to learn, to store and to retrieve information.

In accordance with an aspect of the present invention, a magnetic effect artificial intelligence system is provided. The magnetic effect artificial intelligence system includes an input pre-processing unit, a plurality of magnetic effect artificial neurons connected with the input pre-processing unit, and an output unit connected with the plurality of magnetic effect artificial neurons. Each of the plurality of magnetic effect artificial neurons is shaped as a three-layered hexagonal prism made of Mu-metal and ferrite materials, and substantially attaches to adjacent ones of the plurality of magnetic effect artificial neurons.

In an embodiment, each of the plurality of magnetic effect artificial neurons includes a top layer, a middle layer and a bottom layer, the top layer includes a top head, a top body and a top tail, the middle layer includes a middle head, a middle body and a middle tail, and the bottom layer includes a bottom head, a bottom body and a bottom tail.

In an embodiment, the middle head and the middle tail are made of ferrite, and the middle body is made of Mu-metal.

In an embodiment, the top head, the top body and the top tail are made of Mu-metal.

In an embodiment, the bottom head, the bottom body and the bottom tail are made of Mu-metal.

In an embodiment, the input pre-processing unit includes a rectifier capable of converting a direct current signal to an alternating current signal.

In an embodiment, each of the plurality of magnetic effect artificial neurons includes a signal differential module con-nected to the input pre-processing unit; a first pulsating direct current module and a second pulsating direct current module, both of which are connected to the signal differen-tial module; a first magnetoresistance and amplification unit and a second magnetoresistance and amplification unit, both of which are connected to the first pulsating direct current module, the second pulsating direct current module, and the signal differential module; and a trigger unit connected between the first magnetoresistance and amplification unit and the second magnetoresistance and amplification unit.

In an embodiment, the signal differential module is a signal differentiator configured to direct a signal to either the first pulsating direct current module or the second pulsating direct current module.

In an embodiment, the first pulsating direct current mod-ule is a semiconductor diode bridge configured to generate a pulsating direct current with positive polarity, and the second pulsating direct current module is a semiconductor diode bridge configured to generate a pulsating direct cur-rent with negative polarity.

In an embodiment, the first magnetoresistance and ampli-fication unit and the second magnetoresistance and ampli-fication unit are magnetoresistance amplifiers configured to measure magnetic field strength and work with correspond-ing resistance to generate signal gain.

In an embodiment, the trigger unit is a threshold-exceeded starter configured to conduct electrical current when an accumulated input signal reaches or exceeds a threshold voltage.

In an embodiment, the input pre-processing unit includes a shunt unit connected to the signal differential module and the second magnetoresistance and amplification unit.

In an embodiment, the first magnetoresistance and ampli-fication unit is disposed inside the middle head and the second magnetoresistance and amplification unit is disposed inside the middle tail.

In an embodiment, the trigger unit is disposed inside the middle body.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed. The drawings of all the embodiments of the present invention are merely schematic and do not represent true dimensions and proportions.

The present invention relates to a magnetic effect artificial intelligence system, which trains, stores and retrieves information by means of magnetic fields to simulate human brains to create artificial intelligence. Particularly, the magnetic effect artificial intelligence system includes magnetic effect artificial neurons made of ferromagnetic or ferrite materials. The training process is achieved by the buildup of induced magnetic fields. The trained magnetic effect artificial neurons store the information by measuring the magnetic property and the information is retrieved by electronic circuits and components.

Each magnetic effect artificial neuron has three layers of structures made of ferromagnetic or ferrite materials. The magnetic effect artificial intelligence system utilizes the magnetic fields and electromagnetic property to train the neurons with feedback signals, and adjusts the training weights relating to the induced remanence. The training of the magnetic effect artificial neurons induces magnetization to neighboring neurons and also creates influence on training weights. The influence can be enhancement or attenuation. Each neuron substantially attaches or is very close to adjacent neighbors and forms interactions by means of boundary effect, induction effect and diffusional effect of magnetic field.

Figure 1:
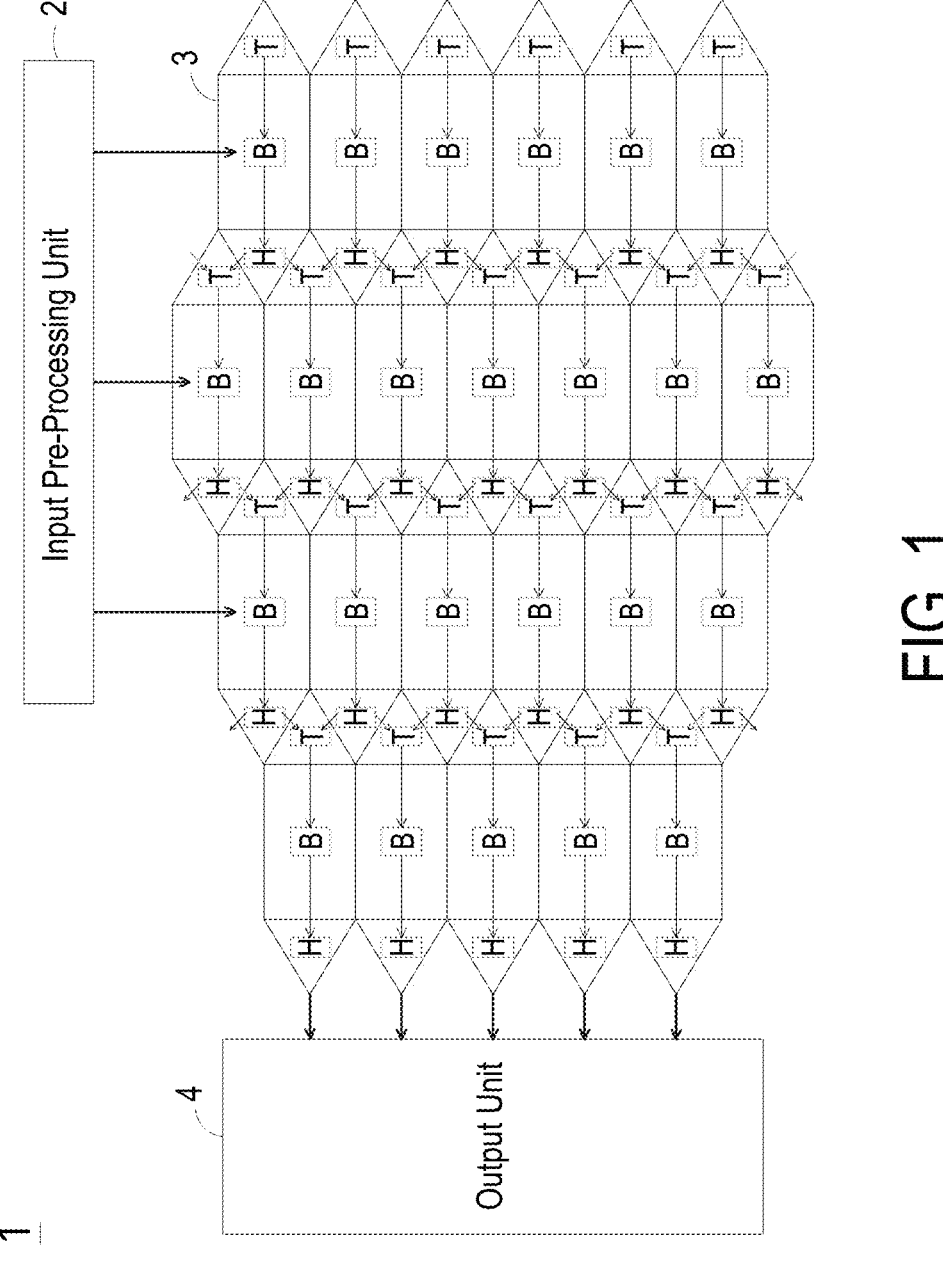
FIG. 1 illustrates a schematic diagram of the magnetic effect artificial intelligence system according to a preferred embodiment of the present invention.
Figure 2:
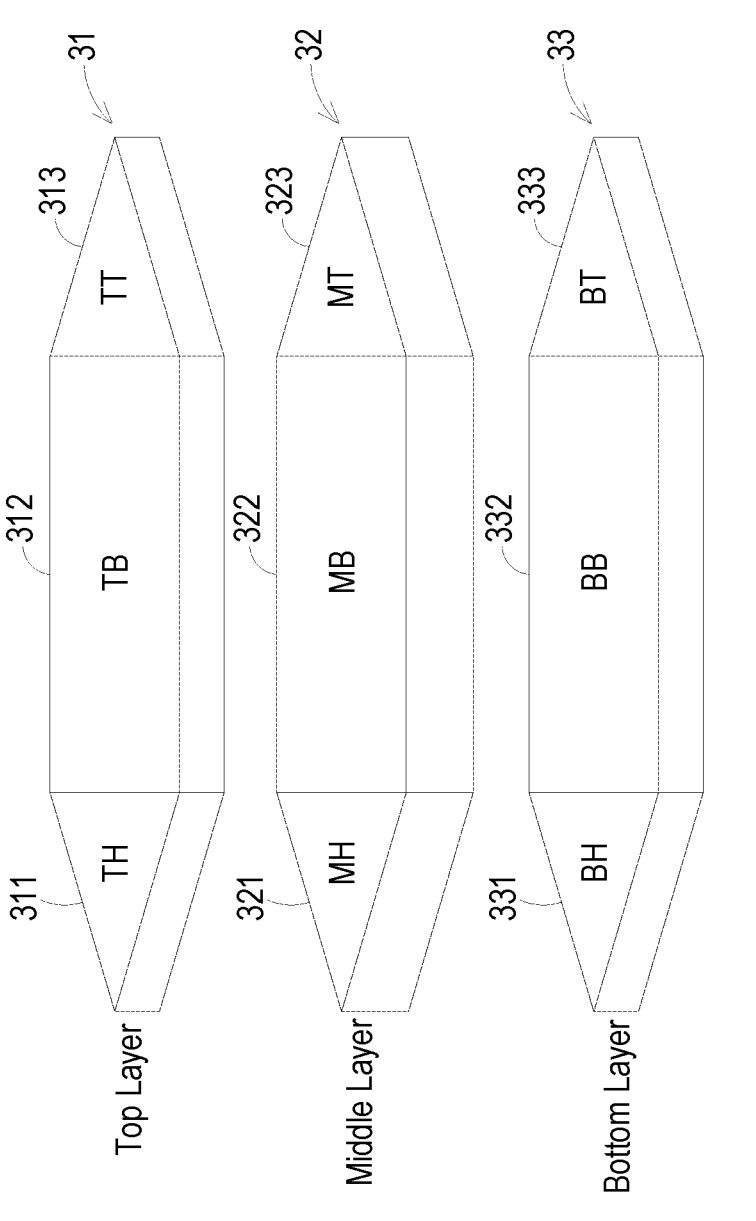
FIG. 2 illustrates the three-layer structure of the magnetic effect artificial neuron according to a preferred embodiment of the present invention.

FIG. 1 illustrates a schematic diagram of the magnetic effect artificial intelligence system according to a preferred embodiment of the present invention. FIG. 2 illustrates the three-layer structure of the magnetic effect artificial neuron according to a preferred embodiment of the present invention. The magnetic effect artificial intelligence system 1 includes an input pre-processing unit 2, a plurality of magnetic effect artificial neurons 3, and an output unit 4. The plurality of magnetic effect artificial neurons 3 are connected with the input pre-processing unit 2 and the output unit 4. Each of the magnetic effect artificial neurons 3 is shaped as a three-layered hexagonal prism, and substantially attaches or is very close to adjacent ones of the magnetic effect artificial neurons 3. Each of the magnetic effect artificial neuron 3 includes three parts of head (H), body (B) and tail (T).

The hexagonal prism is a three-dimensional geometric structure with two hexagonal bases connected by six rectangular faces. The top and bottom hexagonal bases of the hexagonal prism are in the shape of a hexagon and are congruent with each other. In the embodiment, the hexagon is a flattened or stretched hexagon, which is flattened or stretched along one symmetry direction of a regular hexagon, and can be divided into a middle rectangle and two triangles on both sides of the middle rectangle. The body part corresponds to the middle rectangle, and the head part and the tail part correspond to the two triangles, respectively. Due to the symmetrical shape of the neuron 3, the two rectangular faces of the triangular head part of the neuron 3 can attach one rectangular face of the triangular tail part of one adjacent neuron 3 and one rectangular face of the triangular tail part of another adjacent neuron 3. Therefore, as shown in FIG. 1, the neuron 3 can be tightly arranged, which is beneficial for signal transmission.

The three-layer structure of the magnetic effect artificial neuron is further shown in FIG. 2. The magnetic effect artificial neuron 3 includes a top layer 31, a middle layer 32 and a bottom layer 33. Each layer also includes three parts as described as follows.

The top layer 31 can be identified as three parts including a top head (TH) 311, a top body (TB) 312 and a top tail (TT) 313. Each of the TH 311, the TB 312 and the TT 313 is made of a material with high magnetic permeability and low magnetic saturation. In an embodiment, each of the TH 311, the TB 312 and the TT 313 is made of Mu-metal (μ-metal), which is a nickel-iron soft ferromagnetic alloy.

The middle layer 32 can be identified as three parts including a middle head (MH) 321, a middle body (MB) 322 and a middle tail (MT) 323. The MH 321 is made of a material with high magnetic permeability and high magnetic saturation, the MB 322 is made of a material with high magnetic permeability and low magnetic saturation, and the MT 323 is made of a material with high magnetic permeability and high magnetic saturation. In an embodiment, the MH 321 is made of ferrite, the MB 322 is made of Mu-metal (μ-metal), and the MT 323 is made of ferrite.

The bottom layer 33 can be identified as three parts including a bottom head (BH) 331, a bottom body (BB) 332 and a bottom tail (BT) 333. Each of the BH 331, the BB 332 and the BT 333 is made of a material with high magnetic permeability and low magnetic saturation. In an embodiment, each of the Each of the BH 331, the BB 332 and the BT 333 is made of Mu-metal (μ-metal).

The top layer 31 and the bottom layer 33 are served as protection layers, and the different materials used for the different parts of the neuron 3 are beneficial for signal orientation.

Figure 3:
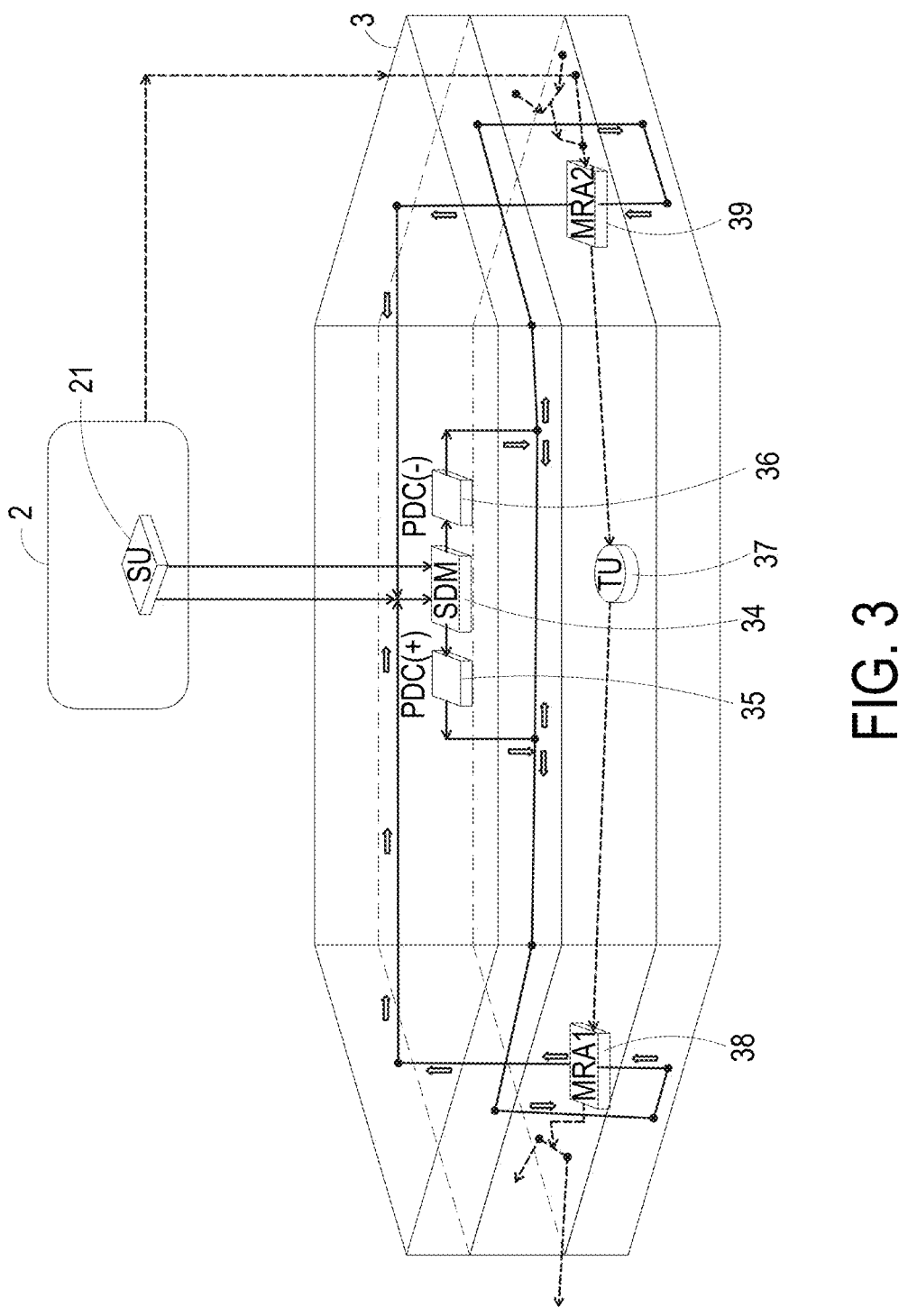
FIG. 3 illustrates a schematic diagram of signal transmission of the magnetic effect artificial neuron according to a preferred embodiment of the present invention.
Figure 4:
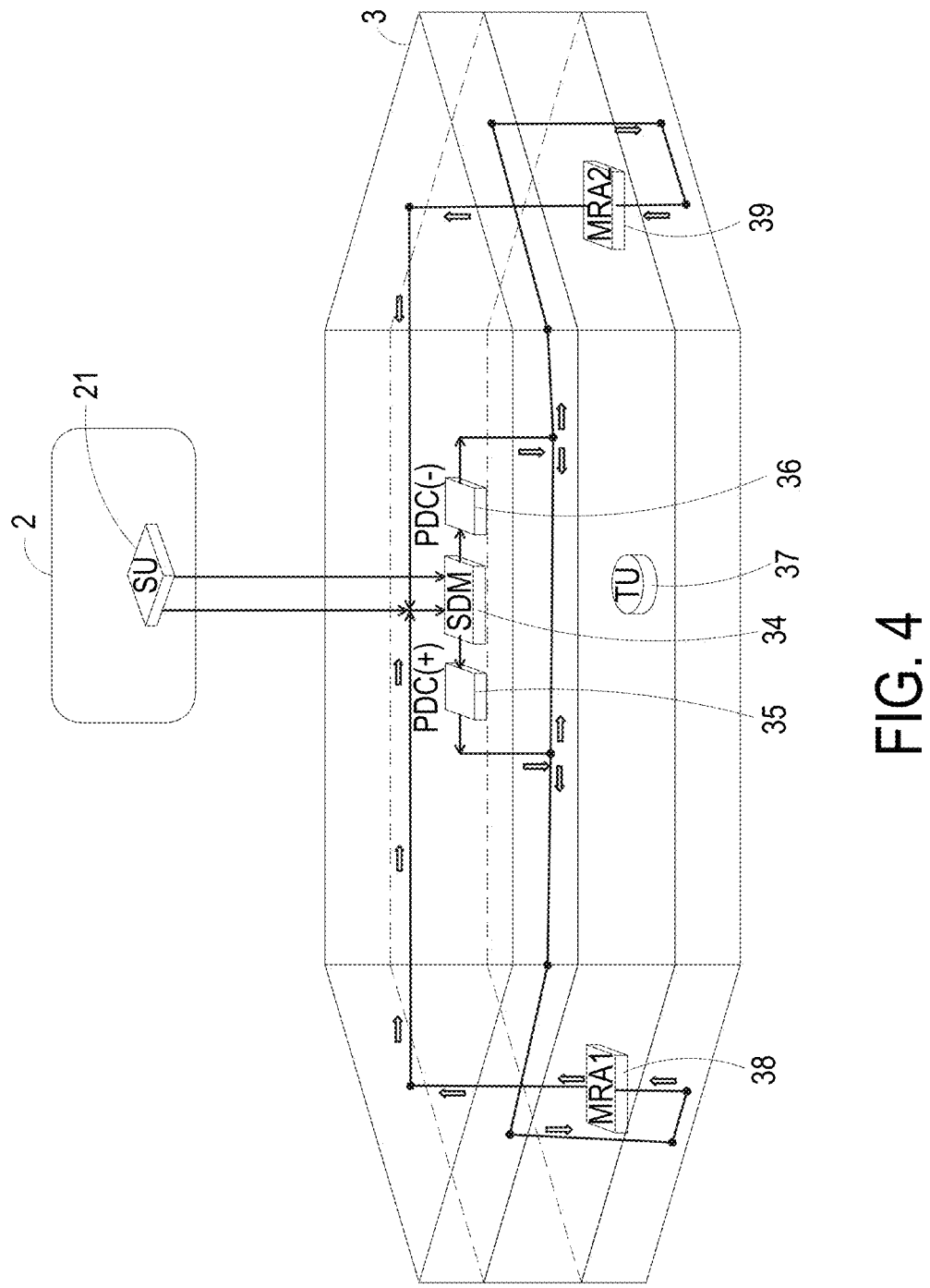
FIG. 4 illustrates a schematic diagram of signal transmission of the magnetic effect artificial neuron in the training mode.
Figure 5:
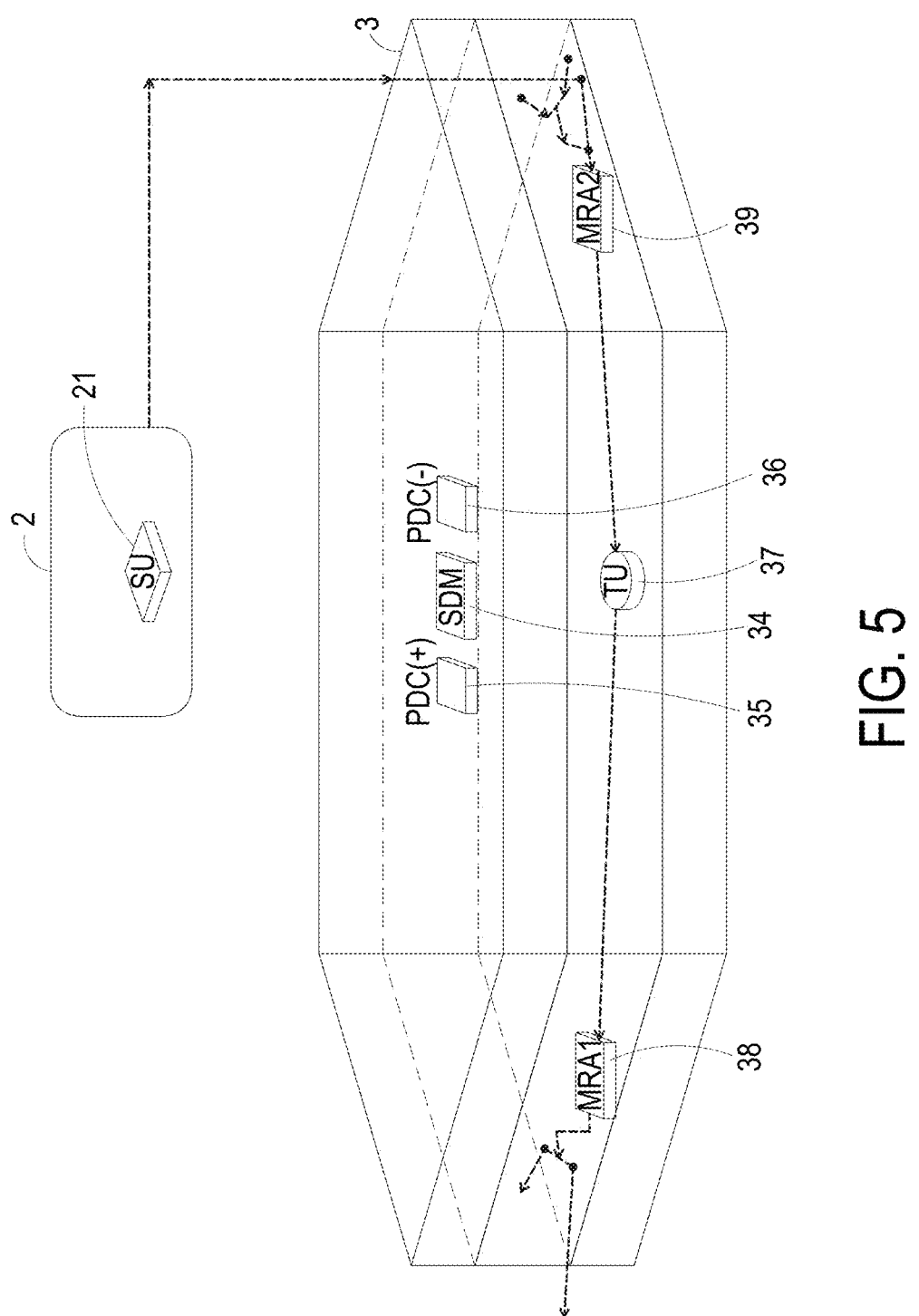
FIG. 5 illustrates a schematic diagram of signal transmission of the magnetic effect artificial neuron in the retrieving mode.

FIG. 3 illustrates a schematic diagram of signal transmission of the magnetic effect artificial neuron according to a preferred embodiment of the present invention. Particularly, FIG. 4 illustrates a schematic diagram of signal transmission of the magnetic effect artificial neuron in the training mode, while FIG. 5 illustrates a schematic diagram of signal transmission of the magnetic effect artificial neuron in the retrieving mode.

The input pre-processing unit 2 includes a shunt unit (SU) 21, and the magnetic effect artificial neuron 3 includes a signal differential module (SDM) 34, a first pulsating direct current (PDC) module (denoted by PDC(+)) 35, a second pulsating direct current (PDC) module (denoted by PDC(−)) 36, a trigger unit (TU) 37, a first magnetoresistance and amplification (MRA) unit (denoted by MRA1) 38, and a second magnetoresistance and amplification (MRA) unit (denoted by MRA2) 39. The MRA1 38 is disposed inside the MH 321 and the MRA2 39 is disposed inside the MT 323. The TU 37 is disposed inside the MB 322. The SDM 34, the PDC(+) 35 and the PDC(−) 36 are preferably disposed inside the TB 312, but not limited thereto.

The PDC(+) 35 and the PDC(−) 36 are both connected to the SDM 34. The MRA1 38 and MRA2 39 are both connected to the PDC(+) 35, the PDC(−) 36 and the SDM 34. The TU 37 is connected between the MRA1 38 and MRA2 39.

In an embodiment, the input pre-processing unit 2 includes but not exclusively a rectifier capable of converting a direct current (DC) signal to an alternating current (AC) signal. The input pre-processing unit 2 is to pre-process the input signal. For example, the input pre-processing unit 2 performs processes of accepting input sources, connecting circuits from the SU 21 to the SDM 34 and the MRA2 39 of each neuron 3, and converting the input signal to be alternating current (AC) signal.

In an embodiment, the SU 21 is a shunter, which includes but not exclusively a solid state relay (SSR) as a switch. The SU 21 is inside the input pre-processing unit 2 and determines the modes of the magnetic effect artificial intelligence system 1 to be in a training mode or in a retrieving mode by judging the input signal. If one input signal is presented, the system 1 is in the retrieving mode, and the SU 21 will direct the input signal to the working example of the retrieving mode shown in FIG. 5. If two or multiple input signals are presented, the system 1 is in the training mode, wherein the two or multiple input signals include a data input signal and a training sample signal. The data input signal and the training sample signal are directed to the SDM 34 shown in FIG. 4.

In an embodiment, the SDM 34 is a signal differentiator, which includes but not exclusively electronic differential circuits configured to direct the signal to either PDC(+) 35 or PDC(−) 36. The SDM 34 differentiates the two input signals coming from the SU 21 while the system 1 is in the training mode. The SDM 34 then will output the signal that has larger strength. When the data input signal is stronger, the output signal is directed to the PDC(−) 36. When the training sample signal is stronger, the output signal is directed to the PDC(+) 35.

In an embodiment, the PDC(+) 35 is a semiconductor diode bridge configured to generate a pulsating DC with positive polarity, while the PDC(−) 36 is a semiconductor diode bridge configured to generate a pulsating DC with negative polarity.

In an embodiment, the TU 37 is a threshold-exceeded starter (TES), which includes but not exclusively a diode for alternating current (DIAC) as a trigger device when the strength of signals is accumulated to designated threshold level, and the starter will start to conduct electrical current. Thus, the TU 37 conducts electrical current when the accumulated input signal reaches and/or exceeds its threshold voltage.

In an embodiment, the MRA unit is a magnetoresistance amplifier whose operating is based on changes of its electrical resistance value caused by an externally-applied magnetic field. When the electrical resistance alters, the electrical current alters according to the Ohm's Law. Accordingly, the MRA1 38 and MRA2 39 are able to measure the magnetic field strength and work with corresponding resistance to generate signal gain.

In an embodiment, the output unit 4 includes hardware that converts information into a human-perceptible form or into a physical machine-readable form for use. For example, the output unit 4 includes monitors, printers, speakers, headphones, projectors, GPS devices, optical mark readers, and universal serial bus (USB) connectors.

The circuits used in the magnetic effect artificial intelligence system 1 of the present invention are coated with insulation materials and/or magnetic shielding materials.

The directions and polarity of the electrical current in the system 1 of the present invention give different effects on magnetization: increasing the induced magnetic field or decreasing the induced magnetic field.

Let Sat(x) denote the magnetization saturation of x, then Sat(MH)≥$\sqrt{2}$Sat(MT).

When the system 1 is in the training mode, both the data input signal and the training sample signal are fed into the SDM 34 as shown in FIG. 4. The SDM 34 differentiates the two input signals and outputs the stronger signal. If the data input signal is stronger, it is directed to the PDC(−) 36, then the PDC(−) 36 generates the pulsating DC with negative polarity which splits to both the MRA1 38 and the MRA2 39. The pulsating DC travels and splits into the MH 321 and the MT 323, changes the induced magnetic strength, which simulates the training weight adjusting, and then feedbacks to the SDM 34 as the new data input signal.

The electric current which travels through the MH 321 and the MT 323 generates magnetic fields around the wire based upon the formula:

$$\oint B_x \cdot d\ell = \mu_0 \int \int J \cdot dS + \mu_0 \varepsilon_0 \frac{d}{dt} \int \int E \cdot dS \qquad \text{(Eq. 1)}$$

$$dB_x = \frac{\mu_0}{4\pi} \frac{Id\ell \times r^{\char`\^}}{r^2} \qquad \text{(Eq. 2)}$$

$$M_x = \chi_m H_x \qquad \text{(Eq. 3)}$$

$$B_x = \mu_0 H_x + M_x \qquad \text{(Eq. 4)}$$

$$\mu = \mu_0(1 + \chi_m) \qquad \text{(Eq. 5)}$$

where J is the total current density; $B_x$ is the magnetic flux density; $\mu_0$ is the magnetic constant; $\varepsilon_0$ is the permittivity of free space; $\mu$ is the magnetic permeability; $H_x$ is the applied magnetic field strength; $\chi_m$ is the volume magnetic susceptibility; $\oint$ is the closed line integral; and $\int\int$ denotes a 2-D surface integral.

The MH 321 is very close to the MT 323 of adjacent neurons, and the MT 323 is very close to the MH 321 of adjacent neurons as shown in FIG. 1. Interactions of magnetic fields of those MT 323 and MH 321 also exist.

Figure 6:
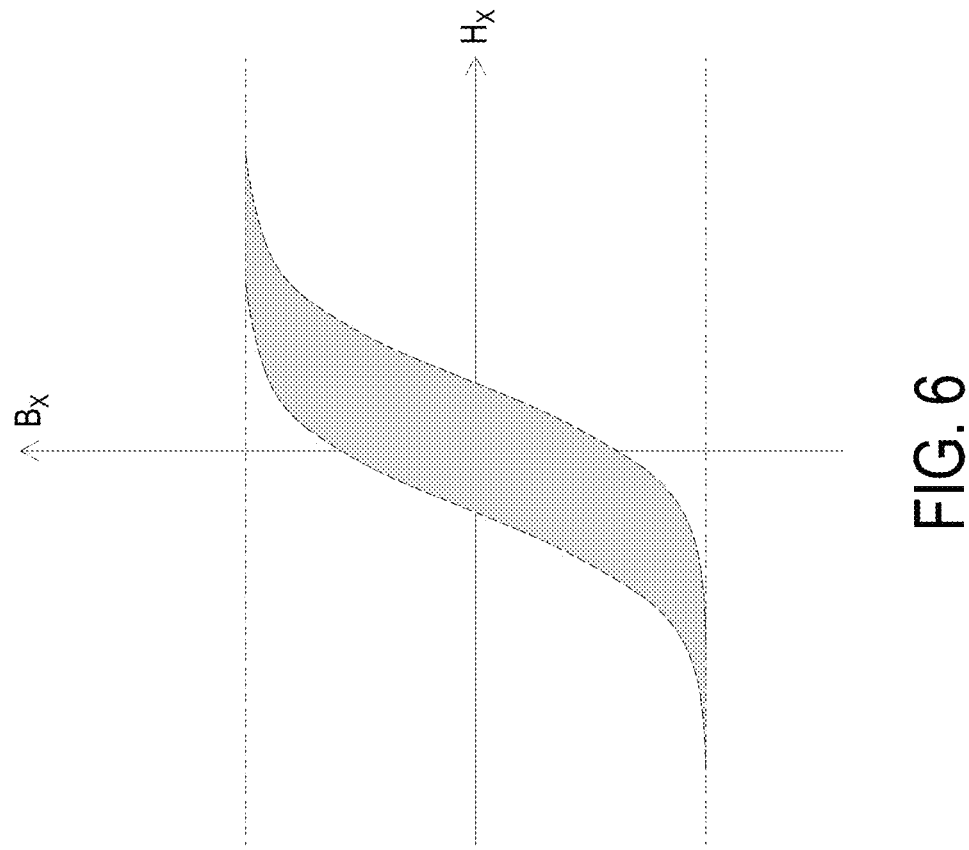
FIG. 6 illustrates the training function of the magnetic effect artificial neuron.

The strength of knowledge/information in the course of training is built up based on FIG. 6. FIG. 6 illustrates the training function of the magnetic effect artificial neuron where $H_x$ denotes the applied magnetic field strength in x and $B_x$ denotes the induced magnetic flux density in x according to a preferred embodiment of the present invention. Positive enhancement of the magnetic field strength increases the induced magnetic flux density until positive magnetic saturation is reached, and negative enhancement of the magnetic field strength decreases the induced magnetic flux density until negative magnetic saturation is reached.

The training process continues until the process is paused or the differences of two input signals converge to certain amount.

When the training processes are completed or paused, the neurons 3 in the disclosed invention contain information in the MH 321 and the MT 323 by means of the induced magnetic field strength.

When the system 1 is in the retrieving mode as shown in FIG. 5, one input signal is presented and goes through the circuits from the SU 21 to the MRA2 39 inside the MT 323 and continues to the TU 37, and then the TU 37 will fire up when the threshold voltage is reached and/or exceeded. The triggered signal will go to the MRA1 38 and obtain signal gain and continue to propagate to the adjacent neurons 3 through the two wires outreaching from the two lateral surfaces of the triangle head part until the signal goes to the output unit 4.

The output unit 4 is configured to match signals to abstract knowledge/information.

In conclusion, the present invention provides the magnetic effect artificial intelligence system includes the magnetic effect artificial neurons. The magnetic effect artificial neuron is shaped as a three-layered hexagonal prism made of Mu-metal and ferrite materials, and substantially attaches to adjacent ones of the plurality of magnetic effect artificial neurons. According to Ampere's law, when a current passes through a conductor, a magnetic field is induced around it, and the direction and the strength of the magnetic field depend on the direction and the magnitude of the current. Since the magnetic effect artificial neurons of the present invention are made of Mu-metal and ferrite materials, the neurons can be magnetized by the induced magnetic field and thus can be used for training so as to learn, to store and to retrieve information. Particularly, each magnetic effect artificial neuron is shaped as a three-layered hexagonal prism and substantially attaches to adjacent neurons, and thus, interactions between the neurons can be formed. Such model greatly reduces the number of computers required for artificial intelligence, and is closer to the operation mode of the human brain.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic effect artificial intelligence system, comprising:

an input pre-processing unit;

a plurality of magnetic effect artificial neurons connected with the input pre-processing unit; and an output unit connected with the plurality of magnetic effect artificial neurons, wherein each of the plurality of magnetic effect artificial neurons is shaped as a three-layered hexagonal prism made of Mu-metal and ferrite materials, and attaches to adjacent ones of the plurality of magnetic effect artificial neurons, wherein each of the plurality of magnetic effect artificial neurons comprises:

a signal differential module connected to the input pre-processing unit;

a first pulsating direct current module and a second pulsating direct current module, both of which are connected to the signal differential module, wherein the first pulsating direct current module is a semiconductor diode bridge configured to generate a pulsating direct current with positive polarity, and the second pulsating direct current module is a semiconductor diode bridge configured to generate a pulsating direct current with negative polarity;

a first magnetoresistance and amplification unit and a second magnetoresistance and amplification unit, both of which are connected to the first pulsating direct current module, the second pulsating direct current module, and the signal differential module; and a trigger unit connected between the first magnetoresistance and amplification unit and the second magnetoresistance and amplification unit.

2. The magnetic effect artificial intelligence system according to claim 1, wherein each of the plurality of magnetic effect artificial neurons comprises a top layer, a middle layer and a bottom layer, the top layer comprises a top head, a top body and a top tail, the middle layer comprises a middle head, a middle body and a middle tail, and the bottom layer comprises a bottom head, a bottom body and a bottom tail.

3. The magnetic effect artificial intelligence system according to claim 2, wherein the middle head and the middle tail are made of ferrite, and the middle body is made of Mu-metal.

4. The magnetic effect artificial intelligence system according to claim 3, wherein the first magnetoresistance and amplification unit is disposed inside the middle head and the second magnetoresistance and amplification unit is disposed inside the middle tail.

5. The magnetic effect artificial intelligence system according to claim 4, wherein the trigger unit is disposed inside the middle body.

6. The magnetic effect artificial intelligence system according to claim 2, wherein the top head, the top body and the top tail are made of Mu-metal.

7. The magnetic effect artificial intelligence system according to claim 2, wherein the bottom head, the bottom body and the bottom tail are made of Mu-metal.

8. The magnetic effect artificial intelligence system according to claim 2, wherein the first magnetoresistance and amplification unit is disposed inside the middle head and the second magnetoresistance and amplification unit is disposed inside the middle tail.

9. The magnetic effect artificial intelligence system according to claim 8, wherein the trigger unit is disposed inside the middle body.

10. The magnetic effect artificial intelligence system in claim 1, wherein the input pre-processing unit comprises a rectifier capable of converting a direct current signal to an alternating current signal.

11. The magnetic effect artificial intelligence system according to claim 1, wherein the signal differential module is a signal differentiator configured to direct a signal to either the first pulsating direct current module or the second pulsating direct current module.

12. The magnetic effect artificial intelligence system according to claim 1, wherein the first magnetoresistance and amplification unit and the second magnetoresistance and amplification unit are magnetoresistance amplifiers configured to measure magnetic field strength and work with resistance to generate signal gain.

13. The magnetic effect artificial intelligence system according to claim 1, wherein the trigger unit is a threshold-exceeded starter configured to conduct electrical current when an accumulated input signal reaches or exceeds a threshold voltage.

14. The magnetic effect artificial intelligence system according to claim 1, wherein the input pre-processing unit comprises a shunt unit connected to the signal differential module and the second magnetoresistance and amplification unit.

* * * * *